United States Patent [19]
Lehureau et al.

[11] Patent Number: 6,014,192
[45] Date of Patent: Jan. 11, 2000

[54] ILLUMINATION DEVICE AND APPLICATION THEREOF TO THE ILLUMINATION OF A TRANSMISSIVE SCREEN

[75] Inventors: Jean-Claude Lehureau, Ste Genevieve des Bois; Cécile Joubert, Paris; Brigitte Loiseaux, Bures sur Yvette, all of France

[73] Assignee: Thomson-CSF, Paris, France

[21] Appl. No.: 08/895,449

[22] Filed: Jul. 16, 1997

[30] Foreign Application Priority Data

Jul. 16, 1996 [FR] France ................................ 96 08854

[51] Int. Cl.[7] .................................................. G02F 1/1335
[52] U.S. Cl. ................................. 349/62; 349/61; 349/69
[58] Field of Search .......................... 362/31, 32; 349/61, 349/62, 69

[56] References Cited

U.S. PATENT DOCUMENTS

| | | |
|---|---|---|
| 4,319,322 | 3/1982 | Allain et al. . |
| 4,451,412 | 5/1984 | Loiseaux et al. . |
| 4,576,434 | 3/1986 | Huignard et al. . |
| 4,847,521 | 7/1989 | Huignard et al. . |
| 5,181,054 | 1/1993 | Nicolas et al. . |
| 5,206,674 | 4/1993 | Puech et al. . |
| 5,211,463 | 5/1993 | Kalmanash . |
| 5,258,969 | 11/1993 | Refregier et al. . |
| 5,272,496 | 12/1993 | Nicolas et al. . |
| 5,323,372 | 6/1994 | Puech et al. . |
| 5,410,421 | 4/1995 | Huignard et al. . |
| 5,416,617 | 5/1995 | Loiseaux et al. . |
| 5,467,206 | 11/1995 | Loiseaux et al. . |
| 5,526,063 | 6/1996 | Joubert et al. . |
| 5,546,200 | 8/1996 | Nicolas et al. . |
| 5,621,547 | 4/1997 | Loiseaux et al. . |

FOREIGN PATENT DOCUMENTS

| | | |
|---|---|---|
| 0 597 261 A1 | 5/1994 | European Pat. Off. . |
| 0 704 655 A1 | 4/1996 | European Pat. Off. . |
| 0 720 040 A2 | 7/1996 | European Pat. Off. . |
| 2 272 277 | 5/1994 | United Kingdom . |

OTHER PUBLICATIONS

Armonk. NY. US, "Liquid crystal display backlight with polarization", IBM Technical Disclosure Bulletin, vol. 38, No. 2 Feb. 1995, pp. 533–535.

*Primary Examiner*—Robert H. Kim
*Attorney, Agent, or Firm*—Oblon, Spivak, McClelland, Maier & Neustadt, P.C.

[57] ABSTRACT

An illumination device comprises a light source coupled to a waveguide. the waveguide comprises a diffracting element capable of diffracting emergent light rays coming from the source, in a direction substantially perpendicular to the surface of the waveguide. A device of this kind is particularly well-suited to transmissive display screens of the liquid crystal display screen type. It can generate a highly collimated, polarized light.

8 Claims, 5 Drawing Sheets

ILLUMINATION DEVICE AND APPLICATION THEREOF TO THE ILLUMINATION OF A TRANSMISSIVE SCREEN

BACKGROUND OF THE INVENTION

The field of the invention is that of illumination devices and especially illumination devices coupled with a transmissive display screen of the liquid crystal screen type.

Generally, liquid crystal screens are made by means of technologies of photolithography. They associate a control matrix with a matrix of electrodes controlling elements with variable birefringence. Each element is bordered by a colored filter and polarizing sheets so as to achieve the amplitude modulation of only one color. In natural light, the transparency of a screen of this kind is in the range of 5%. In appropriately polarized light, this transparency is doubled.

This is why, it becomes necessary to use light sources, the most efficient of which are luminescent tubes in which an electrical discharge is an emitter of ultraviolet light, converted into the visible range by a photoluminescent phosphorus deposited on the envelope or casing of the tube. The efficiency of these tubes is typically about 80 lumens/watts. The maximum luminescence of the tube is about 30,000 candela/m$^2$ in the white.

The means of distributing the light of the tube throughout the surface of the screen are shown in FIG. 1.

The tube 1 is coupled by a reflective envelope 2 to a waveguide 3, consisting for example of a plastic foil with a thickness of a few millimeters. The light is extracted from the waveguide by scattering points 4 distributed on the surface of the film.

The assembly can be complemented by a back-scattering device 5 to increase the light flux extracted towards the screen 6.

In this type of configuration, the balance of luminance and the balance of flux may typically be as follows:
2-watt tube 180 lumens 60 cm$^2$Sr 30,000 Cd/m$^2$
Input of waveguide 120 lumens 40 cm$^2$Sr 30,000 Cd/m$^2$
Waveguide surface 120 lumens 1000 cm$^2$Sr 1200 Cd/m$^2$
Display output 6 lumens 1000 cm$^2$Sr 60 Cd/m$^2$ The major problem encountered in this type of illumination device lies in the low efficiency of extraction of the light, said light being furthermore not polarized at output while the liquid crystal matrices work with polarized light.

Hence, to be able to illuminate a transmissive screen with sufficient energy, in the desired direction, namely perpendicularly to the plane of the waveguide and the plane of the screen, it is indispensable to provide high-powered light sources for supplying the device.

Now, at the present time, it is increasingly being sought to obtain substantial reductions in the amount of electrical power consumed in this type of device. Indeed, in the field of portable screens, the weight of the batteries permitted limits the autonomy of operation. This need to limit power consumption also exists in the field of automobiles or avionics, where the screens are integrated into dashboards and where excessive electrical consumption may result in substantial heating.

In this context, an object of the invention is an illumination device enabling the amount of electrical power consumed to be greatly reduced by means of improved efficiency of extraction of light, this result being obtained by means used to extract polarized light in a useful direction.

SUMMARY OF THE INVENTION

More specifically, an object of the invention is an illumination device comprising a light source and a light waveguide coupled with said light source, wherein the light waveguide comprises a diffracting element located along the waveguide to diffract emergent light rays coming from the source, in a direction substantially perpendicular to the surface of the waveguide.

According to a variant of the invention, the diffracting element is a holographic element that may be formed by a layer of material comprising an optical index grating organized in strata oriented by about 45° with respect to the axis of the light waveguide, said grating being made in the thickness of the layer.

According to another variant, the diffracting element may comprise an etched diffraction grating contained between two mirrors so as to create a resonant cavity, this entire cavity being capable of producing the same effects as a holographic element.

Advantageously, the illumination device may include, at the end of the waveguide opposite the light source, a quarter-wave plate and a mirror parallel to said quarter-wave plate, and may also include a mirror located in a plane parallel to the surface of the waveguide and opposite the plane of extraction of the light.

Advantageously, the light waveguide may take the form of a dihedron that is divergent with respect to the light source, so as to increase the light flux extracted from the waveguide and collimated in a direction substantially perpendicular to the plane of the waveguide.

Yet another object of the invention is an illumination device for a transmissive display screen comprising a superimposition of three illumination devices, a first device A comprising a light source emitting in the red, a second device B comprising a light source emitting in the green, a third device C comprising a light source emitting in the blue.

This type of illumination device has the great value of being efficient for all the energy delivered at the level of a light source, inasmuch as each diffracting element is matched to the wavelength delivered by the source. Thus, there are achieved luminance values substantially three times greater than that obtained with the white sources.

The illumination devices according to the invention are capable of delivering polarized light, for example of the p type. To use any light energy that remains confined, corresponding to the s polarized light in the waveguide and not extracted, the illumination device may advantageously include means to convert the s polarized light s into p polarized light, so as to also extract this light from the light waveguide in the desired direction.

BRIEF DESCRIPTION OF THE DRAWINGS

The invention will be understood more clearly and other advantages shall appear from the reading of the following description; given by way of a non-restrictive example with reference to the appended figures, of which:

FIG. 6b illustrates the optical path followed by a light ray induced in the diffracting structure illustrated in FIG. 6a;

MORE DETAILED DESCRIPTION

Figure 1:
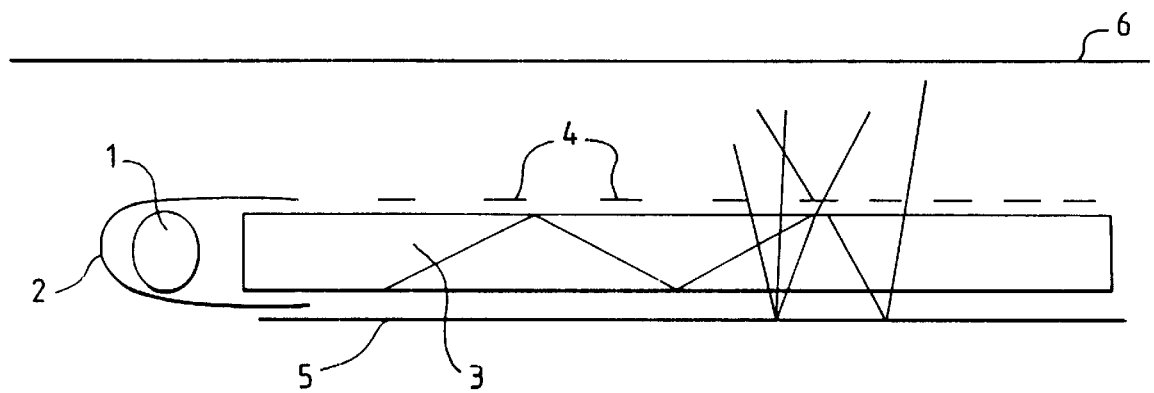
FIG. 1 shows an illumination device according to the prior art.
Figure 2:
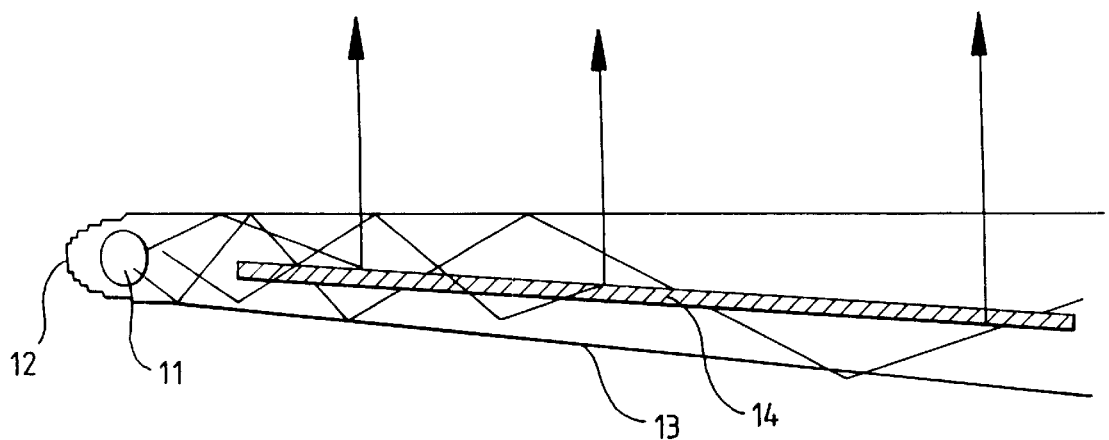
FIG. 2 shows an illumination device according to the invention.

In general, the illumination device according to the invention comprises a light source 11 coupled with a light waveguide 13. This coupling may typically be achieved by a collimator 12. The diffracting element 14 is placed at the core of the waveguide and diffracts rays emerging in a direction substantially perpendicular to the plane of the waveguide as shown in FIG. 2.

At the input of the waveguide, the light takes all the angles of incidence ranging between 90° and the limit angle of reflection at the output of the waveguide (about 40°).

According to a first variant, the diffracting element is a holographic element. More specifically, this element may form an integral part of the waveguide in being inscribed within the volume of the waveguide or on the surface of this waveguide. To make the hologram, two coherent light beams are made to interfere in a conventional way in the plane of a photosensitive layer. To diffract rays emerging in a substantially perpendicular direction, the holographic element may advantageously be formed by preparing an optical index grating, with optical index strata oriented at 45° with respect to the normal to the plane of the light waveguide, in a photosensitive material.

For the recording, two coherent beams are made to interfere in the plane of the photosensitive layer. These two coherent beams are symmetrical with respect to the axis of the layers at 45°. The angle that they form with this axis defines the pitch of the fringes according to the formula:

$$\rho = \lambda/2 \sin u$$

where "u" is the half-angle formed by the two beams.

For the visible wavelength or wavelengths to be extracted from the plane of the waveguide, this angle is substantially equal to 45°. This corresponds to a recording that is impossible inasmuch as one of the beams of light, at recording, would be produced in the plane of the waveguide. Hence, for the recording, the wavelengths chosen are different from the planned visible wavelengths. It is possible in particular to choose ultraviolet wavelengths, thus reducing the angles between the beams and enabling a wide choice of light-refracting materials.

The material recorded must show a variation of refraction index as a function of the insolation at recording. It may typically be a bichromatic gelatine or photopolymer corresponding to the standard materials in which holographic recordings are made.

The waveguide in which the holographic grating is made may advantageously have a dihedral structure.

Figure 3:
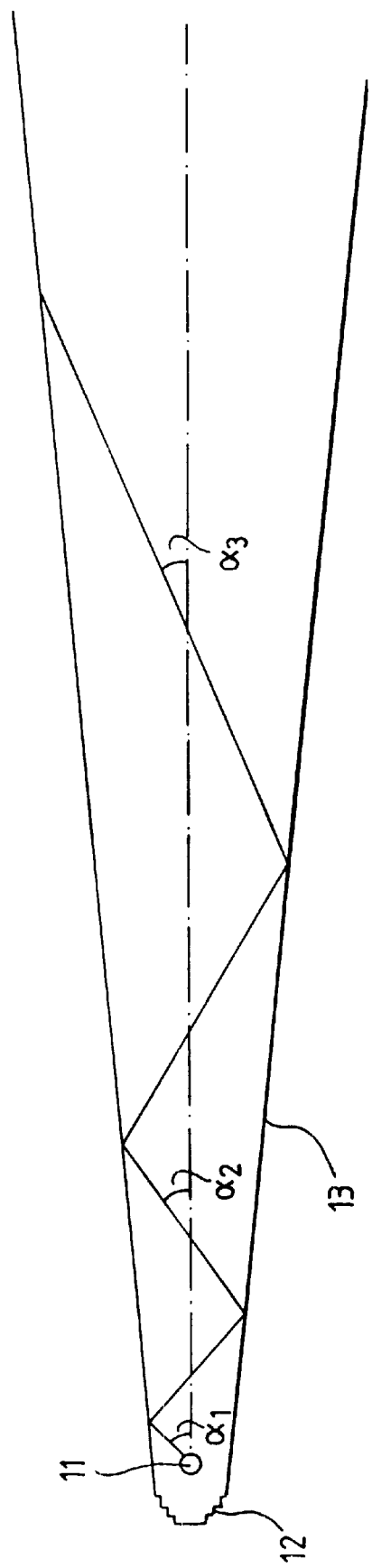
FIG. 3 shows an exemplary waveguide in the form of a dihedron used in an illumination device according to the invention.

FIG. 3 illustrates the way in which the emergent rays may be brought back into the cone for the capturing of the hologram. This cone corresponds to all the angles of incidence for which the hologram is diffracting in the chosen direction, as it happens perpendicularly to the plane of the waveguide. This Figure shows that the angles $\alpha_1$, $\alpha_2$ and $\alpha_3$ shown herein gradually diminish along the optical axis.

Figure 4:
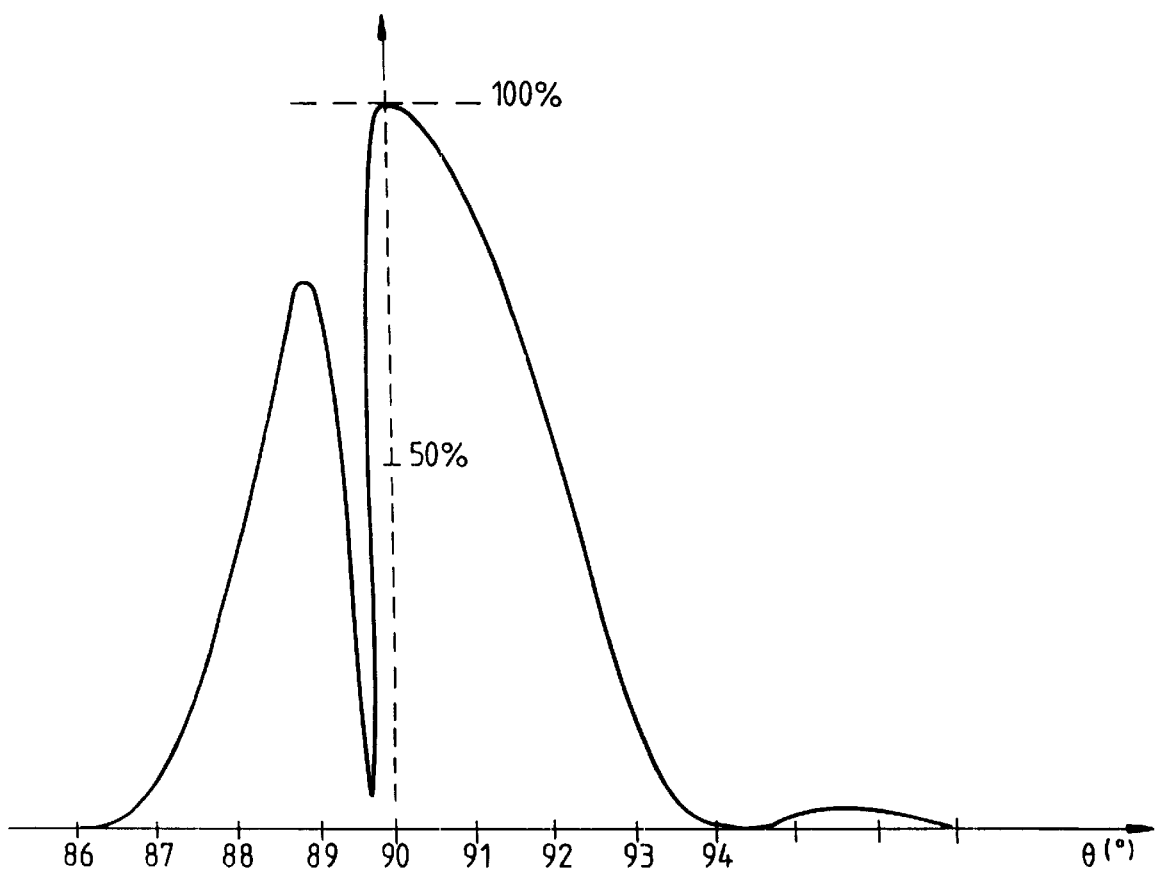
FIG. 4 illustrates the diffraction efficiency expressed in terms of percentage as a function of the angle of incidence in an exemplary holographic element used in the invention.

For high efficiency, the angle of the dihedron is chosen to be smaller than or equal to the maximum angle of capture of the hologram. For example, FIG. 4 shows the angular acceptance of a phase grating (due to a periodic index variation $\Delta n=0.008$) in the form of its diffraction efficiency (expressed in %) as a function of the angle of incidence $\theta$, for a grating with a thickness in the region of 5 $\mu$m.

It must be noted that it is appropriate to match the angular acceptance of the hologram and the angle of the dihedron to each other so that the majority of the rays propagated in the waveguide are at least once within the acceptance cone of the hologram.

Figure 5:
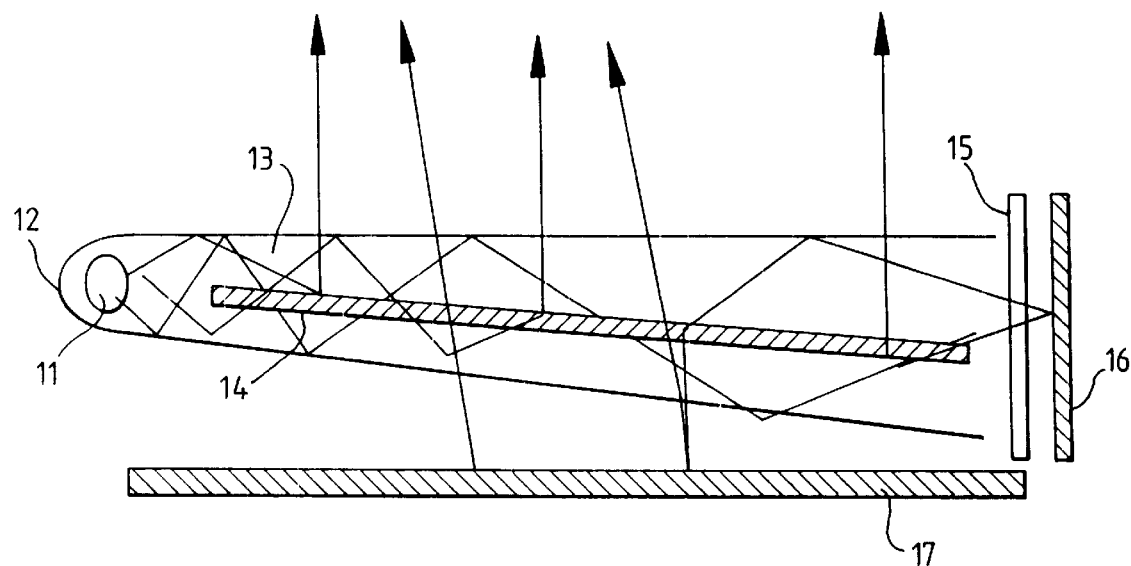
FIG. 5 illustrates an exemplary illumination device comprising means to extract all the light emitted by the light source.

Furthermore, the value of the use of a diffracting holographic element lies in the very excellent collimation that it provides. Indeed, the geometrical extent of a monochromatic beam is not modified by deflection on a homogenous holographic structure. As can be seen in FIG. 5, this gives the formula:

$$S \times \Omega = S' \times \Omega'$$

where $\Omega$ and $\Omega'$ are solid angles. By having a surface area S' that is very great as compared with the surface of S, there is obtained a divergence, expressed by the angle $\Omega'$, that is very small.

Furthermore, a diffracting structure oriented by 45° from the waveguide has the property of transmitting the s type polarization of an incident ray defined perpendicularly to the plane of incidence whereas on the contrary the p type polarization in the plane of incidence is greatly reflected, since the incident rays coming from the source arrive at the Brewster incidence with respect to the diffracting structure. The illumination device according to the invention thus enables the delivery of highly collimated and polarized light.

According to one variant of the invention, the illumination device also includes means to convert the s type polarization transmitted so as to extract this polarization too from the device.

FIG. 5 illustrates this variant in which there are provided a quarter-wave plate 15, a mirror 16 and a mirror 17. The function of the quarter-wave plate constituted, for example, by a birefringent material is to reverse the transmitted s type polarization into a p type polarization. Through the pair of mirrors 16 and 17, this p type polarization is sent back to the diffracting element. This p type polarized light then follows the reverse path and is reflected by the diffracting element. It is not possible to send this light back exactly in the direction taken by the light diffracted in the forward direction for the holographic element would then send it back into the waveguide. This is why the mirror 17 is slightly tilted so as to send this light back in a slightly different direction so that it escapes from the acceptance cone of the hologram and is thus transmitted and not diffracted by the holographic element.

Figure 6A:
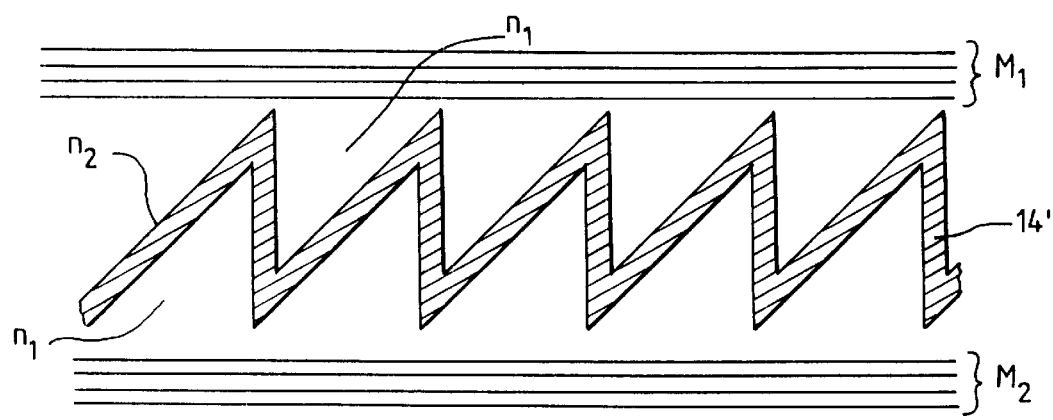
FIG. 6a illustrates an exemplary diffracting structure comprising a resonant cavity with an etched grating.

According to another variant of the invention, the refracting element may-be formed by a grating in relief 14' with strata oriented at 45° as shown in FIG. 6a. This grating is covered with a fine layer of material with an index $n_2$, the grating having an index $n_1$. The entire unit may be embedded in a material with an index $n_1$. This architecture simulates a fine thickness of a holographic element as described here above.

On either side of this architecture, the diffracting element has dielectric multilayer structures so as to fulfill mirror functions $M_1$ and $M_2$ matched with the wavelengths of use.

Figure 6B:
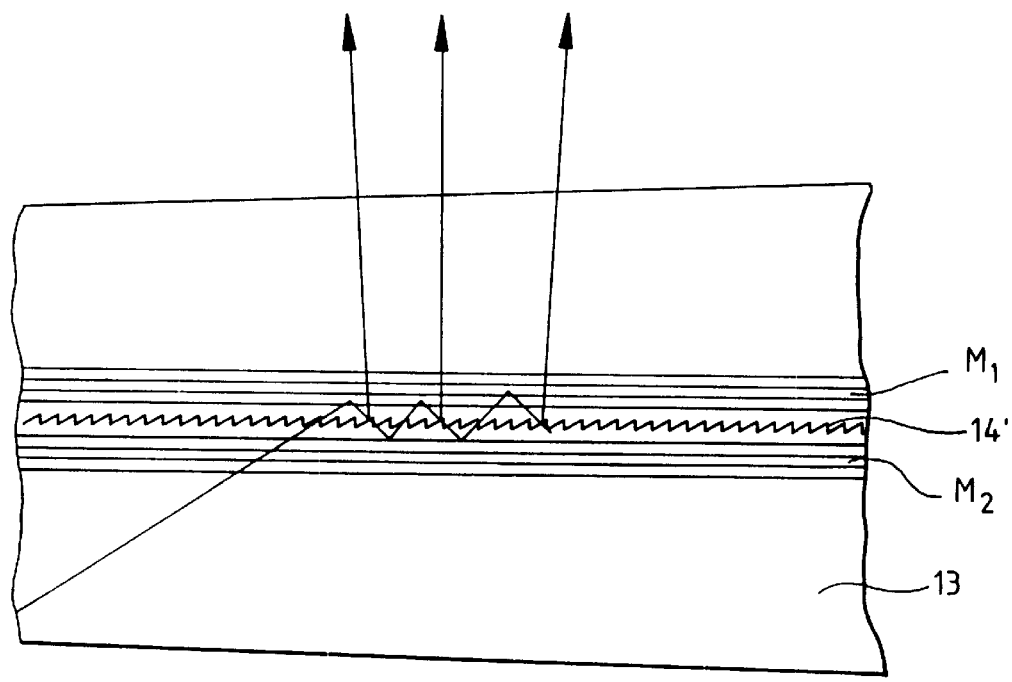

FIG. 6b illustrates the operation of this type of diffractive element comprising a resonant cavity constituted by the mirrors $M_1$ and $M_2$ and an etched grating 14'.

Figure 7:
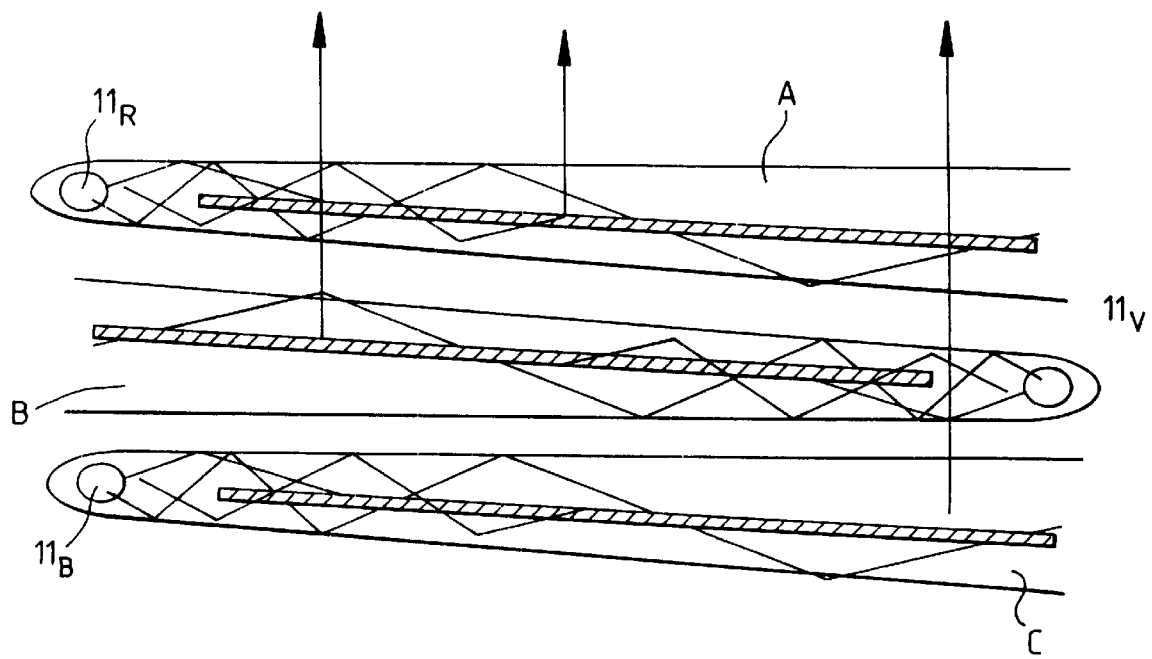
FIG. 7 illustrates an illumination device for a display screen using the superimposition of three illumination devices.

The illumination devices as described here above are particularly useful for display applications. For this type of application, three illumination devices A, B, C are superimposed. The device A is provided with a source $11_R$ emitting in the red, the device B is provided with a source $11_V$ emitting in the green, and the device C is provided with a source $11_B$ emitting in the blue. The superimposition of these three devices is made possible because of the wavelength selectivity of the diffractive elements. Indeed, in the case of holograms, the structure of these diffractive elements is determined as a function of the associated source and the hologram of a given device is transparent for light emitted by an adjacent illumination device as shown in FIG. 7.

To provide optimal compactness, the dihedral structures are alternated at the level of their divergence, i.e. the intermediate device is arranged so that the source is not positioned on the same side as the other two sources.

Furthermore, the luminance of the primary color of each of the red, green and blue fluorescent tubes to be used is substantially three times greater than the luminance of each primary color in a white tube. It is thus possible to estimate the luminance obtained from commercially available tubes at about 50,000 candela/m², this value being obtained with a polarized and highly collimated beam.

What is claimed is:

1. An illumination device comprising:
   a light source outputting light rays at a plurality of angles; and
   a light waveguide coupled with said light source, wherein the light waveguide comprises a diffracting element located within the waveguide to diffract emergent ones of said light rays having angles of incidence between 90° and a limit angle of reflection at an output of said waveguide to provide output light rays which are in a direction substantially perpendicular to a surface of the waveguide.

2. An illumination device according to claim 1, wherein the diffracting element is a holographic element.

3. An illumination device according to claim 1, wherein the waveguide has an optical index grating organized in strata oriented in a direction forming an angle substantially equal to 45° with the normal to the plane of the waveguide.

4. An illumination device according to claim 1, wherein the diffracting element comprises:
   an etched grating, the etchings having flanks with refraction indices at about 45° to the normal to the surface of the waveguide and flanks parallel to the normal to the plane of the waveguide;
   a resonant cavity into which the etched grating is integrated.

5. An illumination device according to claim 4, wherein the etched grating is covered with a layer of material having a refraction index n2, the entire unit being integrated into a material having the same refraction index n1 as that of the grating.

6. An illumination device according to one of the claims 1 to 5, wherein the diffracting element transmits a s polarized light defined perpendicularly to the plane of incidence and diffracts a p polarized light defined perpendicularly to the plane of incidence and wherein said diffracting element comprises means to convert the s polarized light into p polarized light.

7. An illumination device according to claim 6 comprising, at the end of the waveguide opposite the light source, a quarter-wave plate and a mirror parallel to said quarter-wave plate, and also comprising a mirror located in a plane parallel to the surface of the waveguide and opposite the plane of extraction of light.

8. An illumination device for a display screen, comprising a superimposition of three illumination devices according to claim 1, a first device comprising a light source emitting in the red, a second device comprising a light source emitting in the green and a third device comprising a light source emitting in the blue.

* * * * *